Jan. 1, 1957 R. A. GESELLSCHAP 2,776,350
AUTOMATIC ELECTRICAL SECTIONALIZERS
Filed March 12, 1953 4 Sheets-Sheet 1
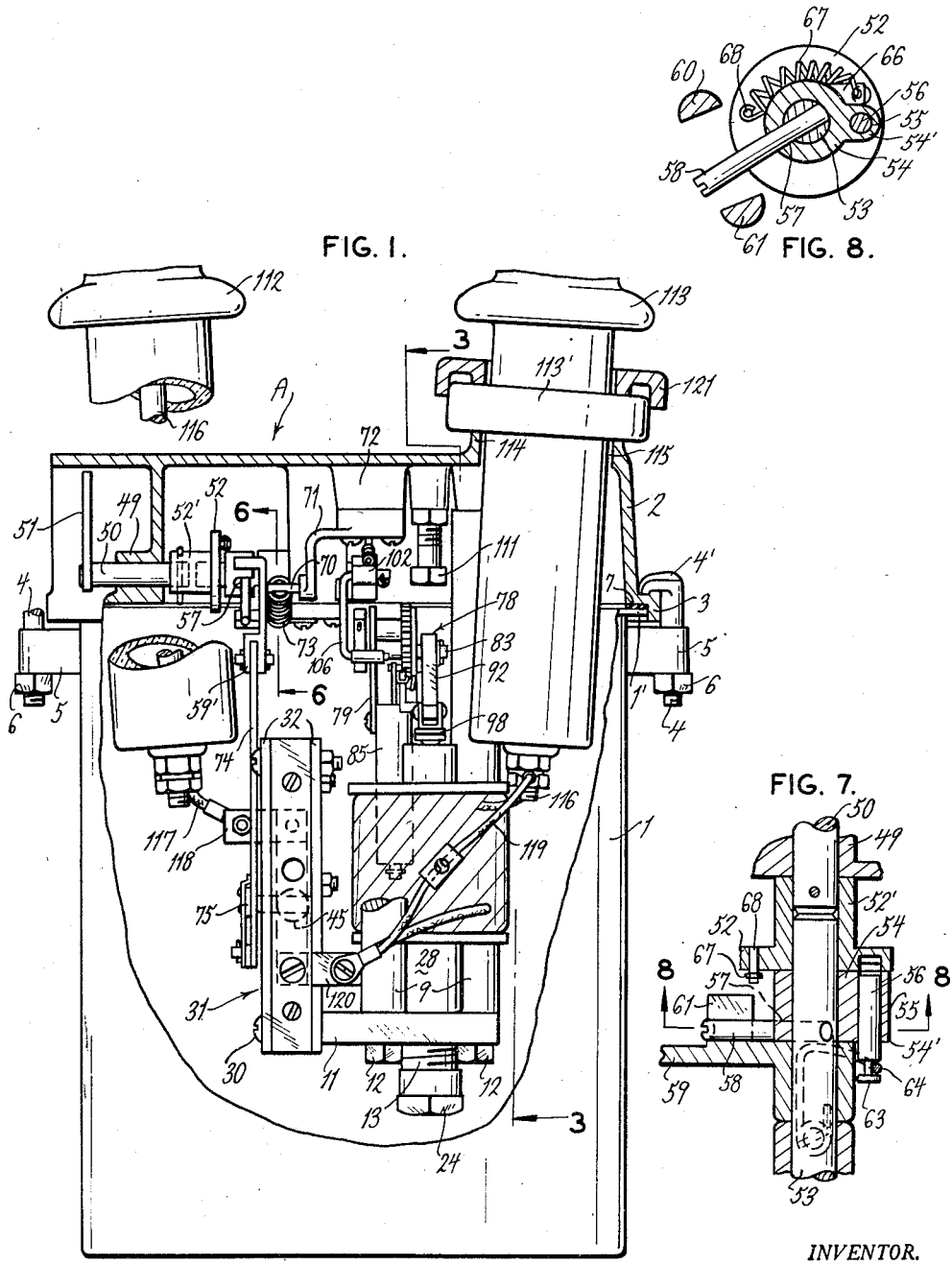
INVENTOR.
ROBERT A. GESELLSCHAP
BY
Em Harrington,
ATTORNEY

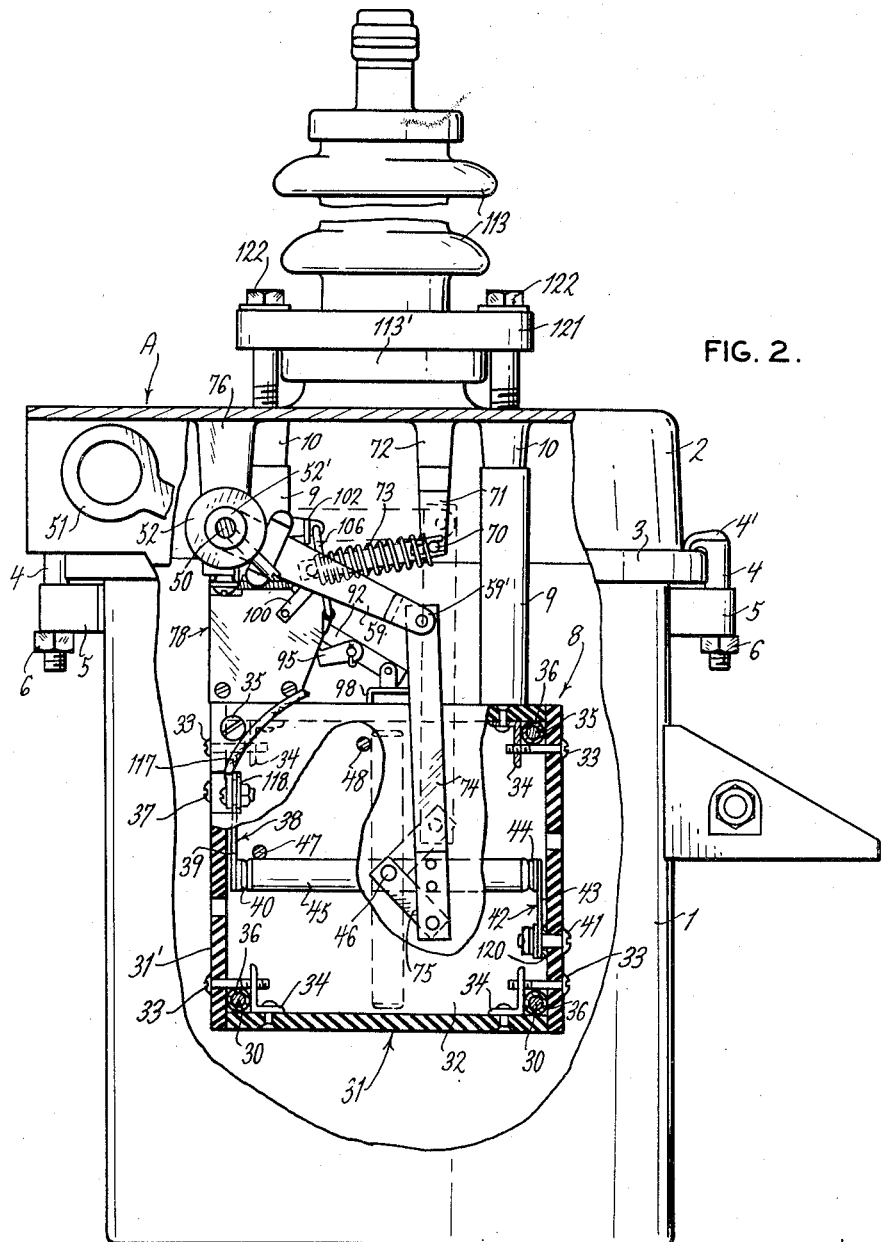

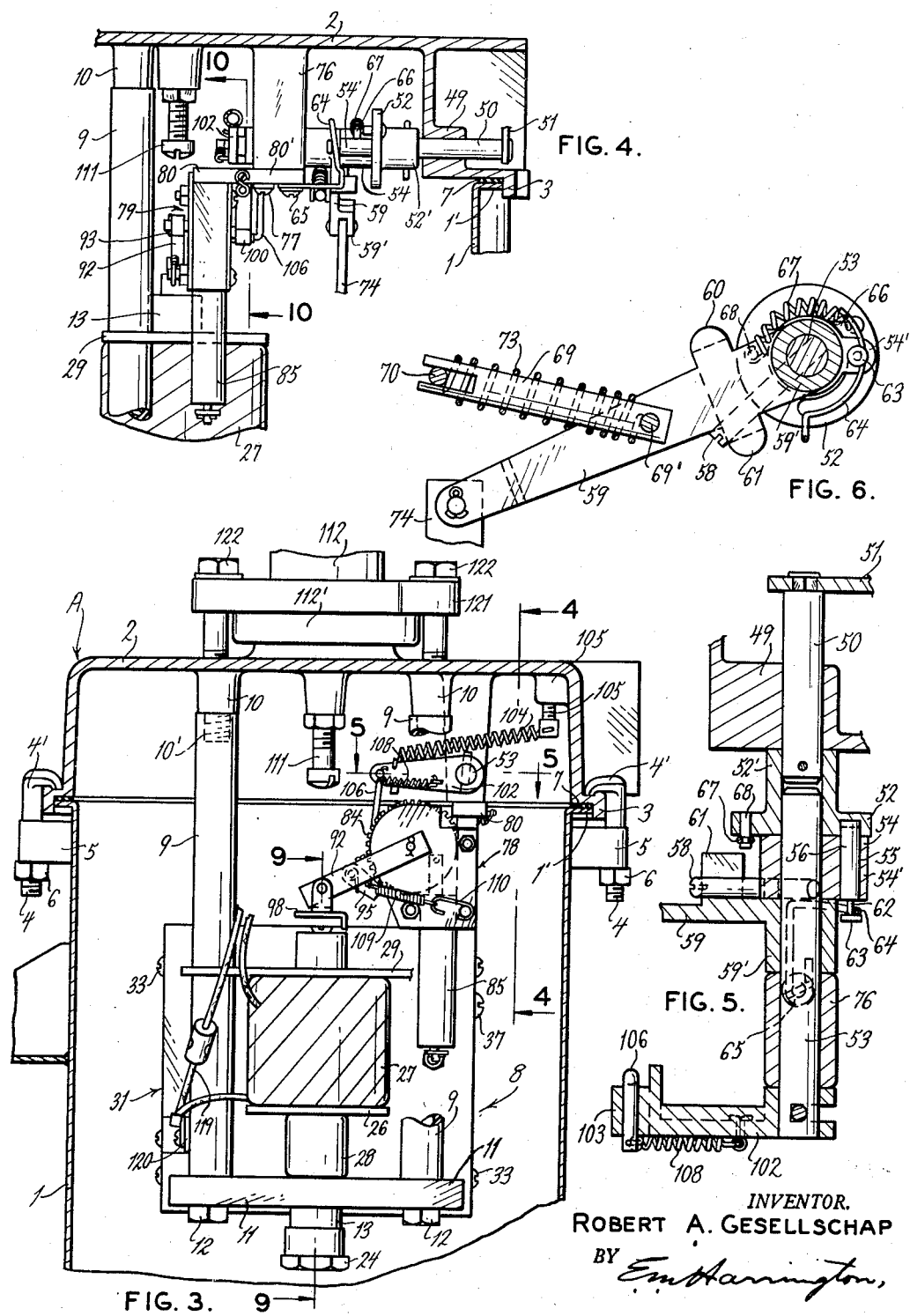

Jan. 1, 1957   R. A. GESELLSCHAP   2,776,350
AUTOMATIC ELECTRICAL SECTIONALIZERS
Filed March 12, 1953   4 Sheets-Sheet 4

INVENTOR.
ROBERT A. GESELLSCHAP
BY
*Fred Harrington.*
ATTORNEY

United States Patent Office 2,776,350
Patented Jan. 1, 1957

2,776,350

AUTOMATIC ELECTRICAL SECTIONALIZERS

Robert A. Gesellschap, Brentwood, Mo., assignor to James R. Kearney Corporation, St. Louis, Mo., a corporation of Missouri Application March 12, 1953, Serial No. 341,997

1 Claim. (Cl. 200—108)

This invention relates generally to electrical sectionalizers, and more specifically to such apparatus which is adapted to provide efficient protection on branch lines where the main lines are protected by oil circuit reclosers, the predominant object of the invention being to provide a sectionalizer, the operation of which is completely automatic and which when installed at the tap of a branch line, will automatically disconnect the branch line from the main line should a permanent fault occur on the line protected by the sectionalizer.

Fig. 1 is a fragmentary side elevation of the improved sectionalizer with parts shown in section and with a portion of the wall of the tank broken away to reveal parts located within said tank.

Fig. 2 is a view similar to Fig. 1, but looking from a different angle.

Fig. 3 is a fragmentary, vertical section taken on line 3—3 of Fig. 1.

Fig. 4 is a fragmentary, vertical section taken on line 4—4 of Fig. 3.

Fig. 5 is a fragmentary, enlarged, horizontal section taken on line 5—5 of Fig. 3.

Fig. 6 is a fragmentary, vertical section taken on line 6—6 of Fig. 1.

Fig. 7 is a view similar to Fig. 5 but showing certain parts of the illustrated mechanism in changed positions.

Fig. 8 is a cross-section taken on line 8—8 of Fig. 7.

Figure 12:
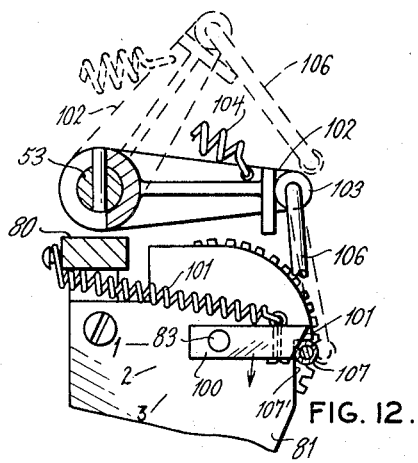
Fig. 12 is a fragmentary elevation of part of the mechanism shown in Fig. 10 but with parts in changed positions.
Figure 11:
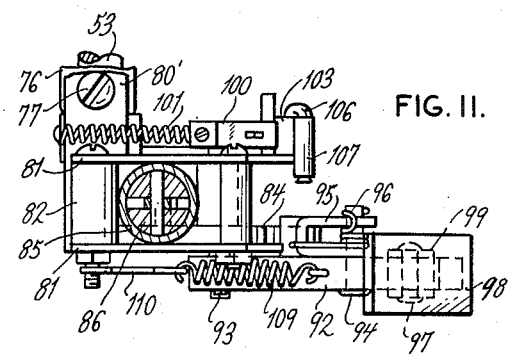
Fig. 11 is a horizontal section taken on line 11—11 of Fig. 10.

In the drawings, wherein is shown for purposes of illustration, merely, one embodiment of the invention, A designates generally the improved automatic sectionalizer of this invention. The sectionalizer A includes a tank 1 which is provided with a cover 2, said cover being provided with an annular flange 3 at its lower edge which is overlapped and engaged by laterally extended portions 4' of clamping bolts 4 that are supported by lugs 5 projected outwardly from the wall of the tank 1 and have nuts 6 associated therewith for drawing said clamping bolts 4 downwardly. A gasket 7 is interposed between a portion of the annular flange 3 of the cover 2 and a flange 1' of the tank to provide a fluid-tight joint between the tank and the cover.

Figure 9:
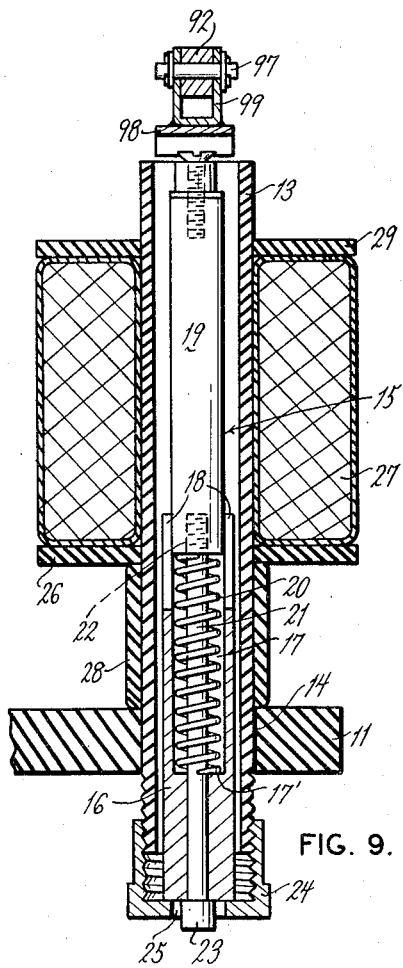
Fig. 9 is an enlarged, vertical section taken on line 9—9 of Fig. 3.

Suspended from the cover 2 and disposed within said cover and within the tank 1 is the sectionalizer assembly 8 of the sectionalizer A. The sectionalizer assembly includes a pair of tubular members 9 which are internally screwthreaded at their opposite end portions, the upper, internally, screwthreaded portions of said tubular members being screwed on externally screwthreaded, lower end portions 10' of studs 10 which project downwardly from the top of wall of the cover 2. At their lower ends the tubular members 9 contact with the top face of a base member 11 and the screwthreaded shanks of bolts 12 extend through apertures formed through said base member and are screwed into the internally screwthreaded lower end portions of said tubular members so as to secure said base member to said tubular members. The base member 11 supports a core insulator 13 which is projected through an opening 14 formed through said base member 11 and is externally screwthreaded at its lower end (Fig. 9). The core insulator embraces an armature assembly 15 which comprises a member 16 in which a recess 17 is formed, the wall of said recess having opposed slots 18 formed therein which are open at the top edge of said wall and extend downwardly of said wall a substantial distance. The armature assembly includes, also, a second member 19 whose lower end portion is projected into the upper portion of the recess 17 of the member 16, and a coil spring 20 is interposed between the lower end face of the member 19 and the base face 17' of the recess 17 formed in the member 16. The coil spring 20 embraces a rod 21 whose screwthreaded upper end portion is screwed into a screwthreaded opening 22 formed in the lower portion of the member 19, and which has formed at its lower end a head 23 that contacts with the lower face of the member 16. Also, the screwthreaded lower end portion of the core insulator 13 has screwed thereon a calibrator 24, shaped as shown in Fig. 9, said calibrator having an opening 25 formed through the bottom wall thereof through which the head 23 of the rod 21 projects. The core insulator 13 supports a collar 26 which serves as a bottom element for a relay coil 27 and a tubular spacer 28, which embraces said core insulator, is interposed between said collar 26 and the top face of the base member 11. The relay coil 27 is provided with a collar 29, similar to the collar 26, which serves as a top element for the relay coil 27.

Secured by means of fastening devices 30 to the base member 11 is an arc chamber assembly 31 which comprises a housing 31' made up of opposed side walls 32, opposed end walls, and top and bottom walls, the opposed end walls being secured to the top and bottom walls by screws 33 which are screwthreadedly seated in screwthreaded openings formed in angular members 34 secured to the top and bottom walls, and the opposed side walls being secured together by the fastening devices 30 previously mentioned, and by screws 35, there being tubular spacers 36 embracing the shank portions of the fastening devices 30 and 35. Secured by means of a screw 37 to one end wall of the housing 31' is a spring contact 38, said spring contact comprising a strip 39 of resilient, conductive material having a contact head 40 at its lower, free end, and secured at its upper end, by means of the screw 37 to said one end wall of the housing 31'. Likewise, secured at its lower end to the opposite end wall of the housing 31' by means of a screw 41 is a second spring contact 42, which comprises a strip 43 of resilient, conductive material having a contact head 44 at its upper end. Disposed within the housing 31' is a gap contact 45 which is supported at its approximate longitudinal center by a pivot 46 for rotary movement about said pivot into and out of contact at its opposite ends with respect to the spring contacts 38 and 42. By referring to Fig. 2 it will be noted that a stop pin 47 is extended transversely of the housing 31' and that this stop pin serves as an abutment which arrests rotary movement of the gap contact 45 on engagement of said gap contact with said stop pin to cause the opposite ends of said gap contact to make electrical contact with the contact heads of the spring contacts 38 and 42. Likewise, a similar stop pin 48 is arranged in such position within the housing 39' that it serves as an abutment which arrests rotary movement of the gap contact 45 when it reaches the position in which said gap contact is shown by broken lines in Fig. 2 where its opposite ends are out of electrical contact with the spring contacts 38 and 42.

By referring to Fig. 1 it will be noted that the cover 2 of the tank 1 is provided with a portion 49 which provides a bearing that supports for rotary movement a shaft 50, said shaft having fixedly mounted thereon at its outer end a pull ring 51. Mounted on the inner end portion of the shaft 50 is a disk 52 having a hub portion 52' which is secured to said inner end portion of the shaft 50, and said disk and its hub portion receive an end portion of a shaft 53 which is disposed in alinement with respect to the shaft 50 (Fig. 5). Mounted on the shaft 53 immediately adjacent to the disk 52 is a member 54 which cooperates with the disk 52 to provide a clutch, said member 54 having an opening 55 formed in a portion 54' thereof which receives a pin 56. The wall of the member 54 has a notch 57 formed therein at the end of said member remote from the disk 52, and extended through this notch is a pin 58 which is screwthreaded at its inner end and is screwthreadedly seated in a screwthreaded opening formed in the shaft 53. Mounted on the shaft 53 immediately adjacent to the member 54 is an arm 59 having a hub portion 59' which embraces said shaft, said arm being provided with extensions 60 and 61 projected from opposite side edges of said arm 59 which contact with said pin 58 in a manner and for a purpose to be hereinafter set forth.

The pin 56 of the member 54 is provided with a neck portion 62 of reduced diameter and a head 63 at the outer end of said neck portion, a portion of a curved spring 64, which is secured by a screw 65 to the lower face of the portion 76 of the cover 2, being disposed in contact with said head of said pin 56 and tending to move said pin outwardly. The member 54 is provided with an ear 66 to which one end of a coil spring 67 is attached, the opposite end of said coil spring being attached to a pin 68 which is projected from the disk 52. The arm 59 has pivoted thereto through the instrumentality of a pivot element 69' a rod 69, said rod at its opposite end being bifurcated and said bifurcated end portion engaging a pin 70 which is projected from an angularly shaped casting 71 which is secured to a stud 72 that is extended downwardly from the top wall of the cover 2 of the tank 1 (Fig. 2). The rod 69 is embraced by a coil spring 73 which contacts at one end thereof with the pivot element 69 and at its opposite end with the pin 70, as is shown to good advantage in Fig. 6. The outer end portion of the arm 59 is bifurcated, as is shown to good advantage at 59' in Fig. 2, and this bifurcated arm portion receives and has pivoted thereto an end portion of a link 74, said link 74 having pivoted to its opposite end portion a relatively short link 75 which is fixed to the axis member of the gap contact 45.

The top wall of the cover 2 of the tank 1 has extended downwardly therefrom a projected portion 76 (Fig. 4) to which is secured a screw 77 and the previously mentioned screw 65, which serves also to secure the spring 64 in place, a housing 78 that houses the mechanism of a time delay assembly 79, said housing have a top wall 80 provided with an extended portion 80' which is secured to the projected portion 76 by the screws 77 and 65. In addition to the top wall 80 the housing 78 includes a pair of opposed side walls 81 and an end wall 82, said walls being suitably secured together to produce a unitary housing. Extended transversely of the housing 78 and supported for rotation in bearing openings formed in the opposed side walls is a shaft 83 on which is fixedly mounted for rotation therewith a gear wheel 84. The housing 78 has welded, or otherwise secured thereto, a tubular member 85 in which is disposed for reciprocating movement a plunger 86 (Fig. 10), said tubular member being provided with a bottom wall 85' having a centrally located aperture 87 formed therethrough. This aperture has associated therewith a valve 88 having a valve head which may be forced into contact with the top face of the bottom wall of the tubular member by the plunger so as to close said aperture 87, and which on upward movement of the plunger may be permitted to raise out of contact with said top face of said bottom wall to permit fluid to pass through said aperture 87. The plunger 86 is connected to the gear wheel by a link 89 which is pivoted to the upper portion of the plunger by a pivot element 90 and at its opposite end is pivoted eccentrically to the gear wheel 84 by means of a pivot element 91.

Mounted loosely on an end portion of the shaft 83 on which the gear wheel 84 is fixedly mounted is an arm 92, said arm being retained on said end portion of said shaft by a cotter pin. The arm 92 has pivotally mounted thereon by means of a pivot element 94 a pawl 95, said pawl having associated therewith a spring 96 that serves to urge the nose portion of said pawl toward engagement with teeth of the gear wheel 84. Pivotally secured to the arm 92 at the outer end thereof by means of a pivot element 97 is an angular-shaped member 98, said angular-shaped member having fixed thereto a U-shaped element 99 between the upwardly extended, spaced legs of which a portion of the arm 92 is disposed, and the pivot element 97 being extended through alined openings formed through said spaced legs of said U-shaped element 99 and through said arm 92.

Figure 10:
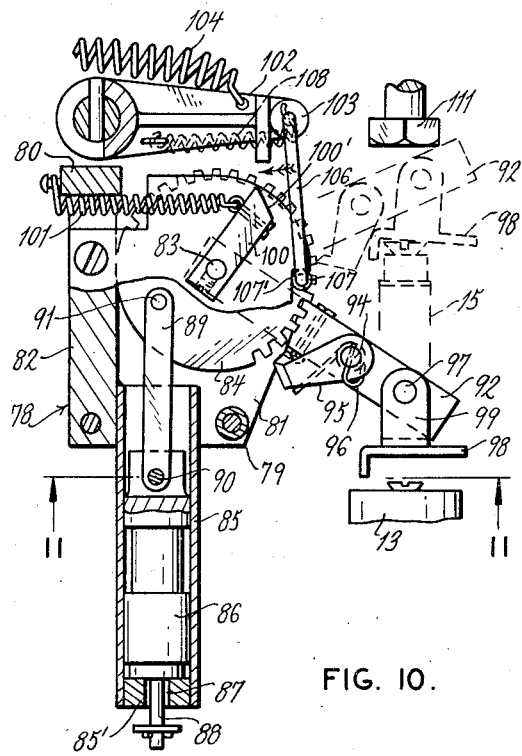
Fig. 10 is an enlarged, fragmentary, vertical section taken on line 10—10 of Fig. 4.

At the opposite side of the housing 81 a trigger 100 is fixedly mounted on the end portion of said shaft 83 at that side of said housing, and said trigger has secured thereto one end of a coil spring 101, the opposite end of said coil spring being secured to the top wall 80 of the housing 81, as is shown to good advantage in Fig. 10. It is important to note that the outer face of the trigger 100 comprises an inclined cam face 100' which serves a purpose to be hereinafter set forth. The shaft 53 has fixedly mounted on an end portion thereof an arm 102 which is provided at its outer end with a bearing portion 103, said arm having attached thereto one end of a coil spring 104, the opposite end of said coil spring being attached to a screwthreaded element 105, extended from a portion 105' of the cover 2 of the tank 1, as is shown to good advantage in Fig. 3. The bearing portion 103 of the arm 102 receives the upper leg of a U-shaped link 106, the lower leg of said link having a sleeve 107 mounted thereon which is normally disposed transversely of one of the pair of opposed side walls of the housing 81 in a notch 107' (Fig. 10) formed in said side wall, the top wall of said notch serving as a keeper which holds the link 106 in its lowered position against the force of the coil spring 104 which tends to elevate the outer end portion of the arm 102 and the link 106 connected thereto. It will be noted that a coil spring 108 is provided one end portion of which extends through an opening formed through the upper leg of the U-shaped link 106. This spring tends to rotate the lower portion of the link 106 in the direction indicated by the arrow in Fig. 10. Also, a coil spring 109 has one end attached to the arm 92 and its opposite end connected to a link 110 which in turn is attached to a fixed part of the sectionalizing assembly 8 and this coil spring tends to draw the free end of the arm 92 in a downwardly direction. Likewise a screwthreaded abutment 111 is provided which limits upward movement of the outer portion of the arm 92.

The improved sectionalizer of this invention includes a bushing 112 and a bushing 113, each of said bushings being of the petticoat type and having a collar 112' or 113' formed thereon which rests an upstanding, annular flange 114 that surround the opening 115 through which the lower portions of said bushing extends into the interior of the tank 1. A conductive rod 116 extends through each of said bushings and means (not shown) are provided at the top of the bushings for connecting conductors of a circuit in which the sectionalizer is interposed, to said rods of said bushings. Connected to the lower end portion of the rod 116 of the bushing 112 is a conductor 117 whose opposite end is connected to an element 118 which is a part of the spring contact 38, and, likewise, a conductor 119 is connected at one end thereof to an element 120 which is a part of the spring contact 42 and at its opposite end to the rod 116 of the bushing 113. The bushings 112 and 113 are each retained in place by means of a cap 121 which is secured to the top wall of the cover 2 of the sectionalizer by means of bolts 122 in a manner to cause the caps 121 to clampingly engage the collars of the bushings.

In the operation of the sectionalizer of this invention a sectionalized circuit protected by a sectionalizer is isolated only when a fault persists through a predetermined number of operations of a back-up oil circuit recloser to which the sectionalizer is related. A rotating trigger 100 having a cam face 100' rotates in conjunction with the main shaft 83 of the time delay mechanism 79, the trigger 100 being capable of being set to cause the sectionalizer to lock out after one, two, or three recloser operations, as will be hereinafter explained. The sectionalizer does not lock open on transient faults, but the mechanism of the time-delay assembly 79 advances toward the lockout position with each opening and reclosing operation of the back-up recloser. When a fault persists, the sectionalizer locks open during the open-circuit interval of the recloser for which the sectionalizer is set. For example: the recloser may be set to lock out after the fourth interruption, and the sectionalizer may be set to lock out during the third open-circuit interval of the recloser. When the third reclosing of the recloser occurs, the sectionalizer will have opened the portion of the line where the fault is present, and service will be restored to all other portions of the system protected by the recloser. On transient faults, the sectionalizer and the recloser automatically reset after the fault has cleared.

On the occurrence of an overload or a fault on the line the magnetic field of the solenoid coil 27 is increased with the result that the member 19 of the armature assembly is moved upwardly of the coil 27. The upper portion of said member 19 contacts with the angular member 98 at the outer end portion of the arm 92 moving said outer end portion of said arm 92 upwardly and the pawl 95 slides by the teeth of the gear wheel 84, and eventually the outer end portion of the arm 92 contacts with the head of the bolt 111 and its upward movement is arrested (see broken lines in Fig. 10). The armature assembly 15 falls by gravity and the coil spring 109 exerts a downward pull on the outer portion of the arm 92 and the pawl 95 engages a tooth of the gear wheel 84 and rotates said gear wheel, and the shaft 83 on which it is mounted, during downward movement of the outer portion of said arm 92. This advances the trigger 100 toward the lockout position and when this position is reached the cam face 100' at the outer end of said trigger cams the sleeve 107, and the lower portion of the link 106, out of notch 107' thereby releasing the arm 102 for movement by the coil spring 104 to the elevated position in which it is shown by broken lines in Fig. 12. Likewise, the arm 59 is simultaneously moved to the elevated position in which it is shown by broken lines in Fig. 2 thereby rotating the gap contact 45 from the closed contact position in which it is shown by full lines in Fig. 2 to the open contact position in which it is shown by broken lines in that view. When it is desired to reset the gap contact in the closed contact position after it has locked open, this may be done manually with the aid of a switch stick which is caused to engage the pull ring 51.

It is to be noted that one of the side walls 81 of the housing 78 of the time delay assembly 79 is provided with an arcuate edge which provides a cam face 81$^a$ and that this arcuate edge merges into a straight, tangentially arranged lower edge portion 81$^b$. The teeth of the gear wheel 84 project above the arcuate cam face 81$^a$ and hence the nose portion of the pawl may engage said teeth without interference from the cam face 81$^a$, the pawl merely sliding along said cam face. However, when the pawl 95, on downward movement of the arm 92, comes in contact with the tangentially arranged lower edge portion it is disengaged from the teeth of the gear wheel 84. Also, the plunger 86 is drawn upwardly within the tubular member 85 to draw oil through the aperture 87 in the bottom wall of said tubular member, past the valve 88, during rotation of the gear wheel 84 in one direction, the reverse movement of said gear wheel being retarded by closing of the valve 88 and the oil being forced to work its way upwardly past the plunger 86. It is this situation that causes the trigger 100 to be indexed toward the position where its cam face 101 forces the lower portion of the link 106 out of the notch 107', because the retarding of movement of the gear wheel 84 by the downwardly moving plunger 86 permits the pawl 95 to again engage a tooth of the gear wheel 84 and rotate the gear wheel in a direction to index the trigger 100 toward the position where the lower portion of the link 106 is moved out of the notch 107' thereby before the gear wheel 84 has completed its reverse movement.

I claim:

In a sectionalizer of the character described having a movable contact member biased into open circuit position and a releasable latch for retaining the movable contact member in closed circuit position, means movable in a fixed orbit between a normal position remote from said latch and a position whereat it releases said latch, said means being biased toward its normal position, a member movable relative to said means and biased in one direction, said member having a ratchet for transmitting its motion to said means when said member is moving in its biased direction, the biased direction of said means being counter to the biased direction of said member, and an electromagnet having a core movable in response to overloads for moving said member against its bias, the improvement which comprises, said core being normally free of said member, means for guiding said core during its movement pursuant to overload in a path obstructed by said member whereby the energy of said core is imparted to move said member out of its normal position but the core is free to move away from said member upon interruption of the overload.

References Cited in the file of this patent

UNITED STATES PATENTS

| | | |
|---|---|---|
| 1,766,292 | Granat | June 24, 1930 |
| 1,856,313 | Brennan | May 3, 1932 |
| 1,864,548 | Nordhem | June 28, 1932 |
| 2,200,509 | Lindae | May 14, 1940 |
| 2,298,143 | May | Oct. 6, 1942 |
| 2,333,604 | Wallace | Nov. 2, 1943 |
| 2,361,221 | Ludwig et al. | Oct. 24, 1944 |
| 2,452,233 | Gerard et al. | Oct. 26, 1948 |
| 2,464,303 | Gesellschap | Mar. 15, 1949 |
| 2,515,530 | Schindler | July 18, 1950 |
| 2,521,194 | Van Ryan | Sept. 5, 1950 |